(12) United States Patent
Smith et al.

(10) Patent No.: US 9,752,611 B2
(45) Date of Patent: Sep. 5, 2017

(54) FASTENER WITH UNIDIRECTIONAL LATCH

(71) Applicant: Alan R. Smith, Reno, NV (US)

(72) Inventors: Alan R. Smith, Reno, NV (US); Ralph W. Bennett, Eugene, OR (US)

( * ) Notice: Subject to any disclaimer, the term of this patent is extended or adjusted under 35 U.S.C. 154(b) by 0 days.

(21) Appl. No.: 14/845,900

(22) Filed: Sep. 4, 2015

(65) Prior Publication Data

US 2015/0377278 A1    Dec. 31, 2015

Related U.S. Application Data

(62) Division of application No. 13/557,560, filed on Jul. 25, 2012, now Pat. No. 9,151,316.

(51) Int. Cl.
*F16B 39/24* (2006.01)

(52) U.S. Cl.
CPC ......... *F16B 39/24* (2013.01); *Y10T 29/49817* (2015.01)

(58) Field of Classification Search
CPC ........ F16B 35/048; F16B 39/24; F16B 39/32; F16B 39/282; Y10T 29/49817; B23P 19/06; B25B 27/00; A61B 17/862; A61B 17/8635

See application file for complete search history.

(56) References Cited

U.S. PATENT DOCUMENTS

| | | | |
|---|---|---|---|
| 6,227,782 B1 * | 5/2001 | Bowling | F16B 35/048 411/114 |
| 6,524,316 B1 | 2/2003 | Nicholson | |
| 7,699,880 B2 | 4/2010 | Orbay | |
| 7,794,484 B2 | 9/2010 | Stone | |
| 2001/0031966 A1 | 10/2001 | Tormala | |
| 2005/0137598 A1 * | 6/2005 | Auth | A61B 17/8635 606/281 |
| 2006/0217715 A1 | 9/2006 | Serhan | |
| 2007/0118125 A1 | 5/2007 | Orbay | |
| 2008/0255622 A1 | 10/2008 | Mickiewicz | |
| 2009/0192551 A1 | 7/2009 | Cianfrani | |
| 2010/0069969 A1 | 3/2010 | Ampuero | |
| 2010/0094356 A1 * | 4/2010 | Varela | A61B 17/862 606/304 |
| 2011/0270326 A1 * | 11/2011 | Black | A61B 17/8038 606/308 |

* cited by examiner

*Primary Examiner* — Jacob Cigna
*Assistant Examiner* — Lee A Holly
(74) *Attorney, Agent, or Firm* — J. Wiley Horton

(57) ABSTRACT

A fastener and associated lock washer having an integral anti-rotation mechanism. The head of the fastener includes a plurality of saw teeth—arranged in a radial array. A lock washer is configured to interact with the head of the fastener. The lock washer includes one or more spring tabs positioned to bear against the radial array of saw teeth. As the fastener is rotated in a first direction, the saw teeth depress and pass over the spring tab(s). However, if the user attempts to rotate the fastener in the opposite direction, the spring tab snaps up into the saw teeth and arrests the motion—in the manner of a ratchet and pawl mechanism. The invention preferably includes a second means for selectively defeating the anti-rotation mechanism.

16 Claims, 25 Drawing Sheets

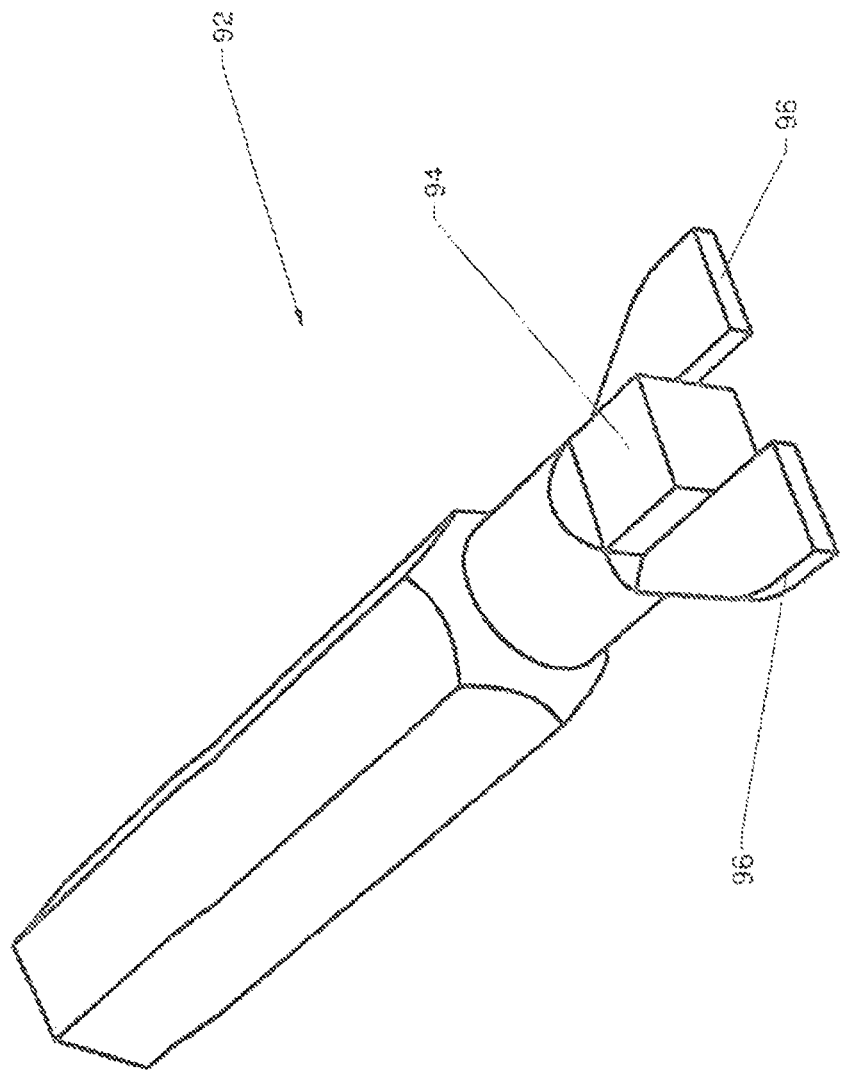

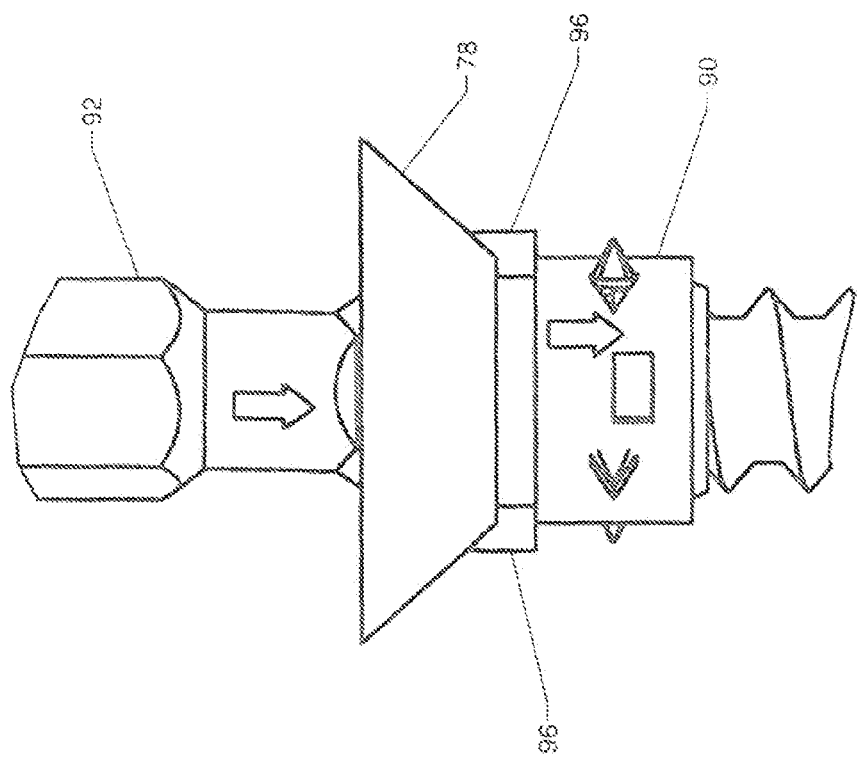

FASTENER WITH UNIDIRECTIONAL LATCH

CROSS-REFERENCES TO RELATED APPLICATIONS

This non-provisional patent application shares a common, disclosure with previously-filed U.S. patent application Ser. No. 13/557,560. This application should therefore be considered a divisional application of U.S. patent application Ser. No. 13/557,560.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

1. Field of the Invention

This invention relates to the field of fasteners. More specifically, the invention comprises a fastener and companion component which cooperate to form a unidirectional latch.

2. Description of the Related Art

Mechanical fasteners are commonly used to pull two separate components together and hold them in a desired position. In such fasteners, threads are most commonly used to convert rotary motion into linear motion. However, simple camming surfaces may also be used for a "quarter-turn" type fastener. The present invention may be applied to many different types of prior art fasteners, including both threaded and camming types. However, for purposes of brevity, the following disclosure uses threaded fasteners to illustrate the preferred embodiments of the invention.

Threaded fasteners are designed to tighten when turned in a first direction and loosen when turned in the opposite direction. The most common thread pattern is a "right-hand thread," in which the fastener is rotated in a clockwise direction to tighten. Those skilled in the art will know that fasteners which convert rotary motion to linear motion may not always remain in the tightened position. The shaft of such a fastener is placed in tension when the fastener is tightened. This tension may cause the fastener to rotate in the opposite direction over time—particularly when vibration or other cyclic motion is present. Thus, a prior art fastener may "back out" over time.

Concern over a fastener gradually working its way loose is particularly acute in the medical field, where threaded fasteners are often used to secure orthopedic hardware. It is known to secure such fasteners by tightening surgical wire over the head of the fastener and threading it through an existing or created orifice in adjacent bone. This is a time-consuming process which produces unpredictable results.

It is desirable to provide a fastener having an integral anti-rotation mechanism so that the fastener may be retained in a tightened state. It is also desirable to provide a means for defeating the anti-rotation mechanism when the user actually desires to remove the fastener. Finally, it is desirable to provide a relatively inexpensive anti-rotation mechanism so that the design may be employed in fields where low cost is a necessity. The present invention provides these features.

BRIEF SUMMARY OF THE INVENTION

The present invention comprises a fastener having an integral anti-rotation mechanism. In the preferred embodiments, the head of the fastener includes a plurality of saw teeth—arranged in a radial array. A second component is configured to interact with the head of the fastener. The second component includes one or more spring tabs positioned to bear against the radial array of saw teeth. As the fastener is rotated in a first direction, the saw teeth depress and pass over the spring tab(s). However, if the user attempts to rotate the fastener in the opposite direction, the spring tab snaps up into the saw teeth and arrests the motion—in the manner of a ratchet and pawl mechanism.

The invention preferably includes a second means for selectively defeating the anti-rotation mechanism. In a preferred embodiment, a release ring is contained within the head of the fastener. This release ring is actuated by using a special extraction tool. When the extraction tool is pressed into the head of the fastener, the release ring depresses the spring tab(s) and allows the fastener to be loosened.

BRIEF DESCRIPTION OF THE SEVERAL VIEWS OF THE DRAWINGS

FIG. 25 is a perspective view, showing an extraction bit configured for use with the deck screw embodiment.

FIG. 26 is a detailed elevation view, showing the use of the extraction bit with the deck screw embodiment.

REFERENCE NUMERALS IN THE DRAWINGS

| | |
|---|---|
| 10 screw | 12 hex head |
| 14 threaded shaft | 16 saw tooth array |
| 18 thrust surface | 20 lock washer |
| 22 outer surface | 24 spring tab |
| 26 spike | 28 inner surface |
| 30 central passage | 32 tip |
| 34 valley | 36 mating surface |
| 38 side wall | 40 corner |
| 42 socket | 44 hexagonal cavity |
| 46 forward surface | 48 round head |
| 50 release ring | 52 annular channel |
| 54 tri-blade receiver | 56 extraction tool |
| 58 tri-blade | 60 tip prong |
| 62 outward facing perimeter surface | |
| 64 inward facing perimeter surface | |
| 66 cylindrical extraction tool | 68 cylinder |
| 70 extension | 72 camming surface |
| 74 handle | 76 deck screw |
| 78 countersunk head | 80 latching shank |
| 82 square drive receiver | 84 access slot |
| 86 annular recess | 88 shoulder |
| 90 lock ring | 92 extraction bit |
| 94 square drive | 96 wing |

DETAILED DESCRIPTION OF THE INVENTION

Figure 1:
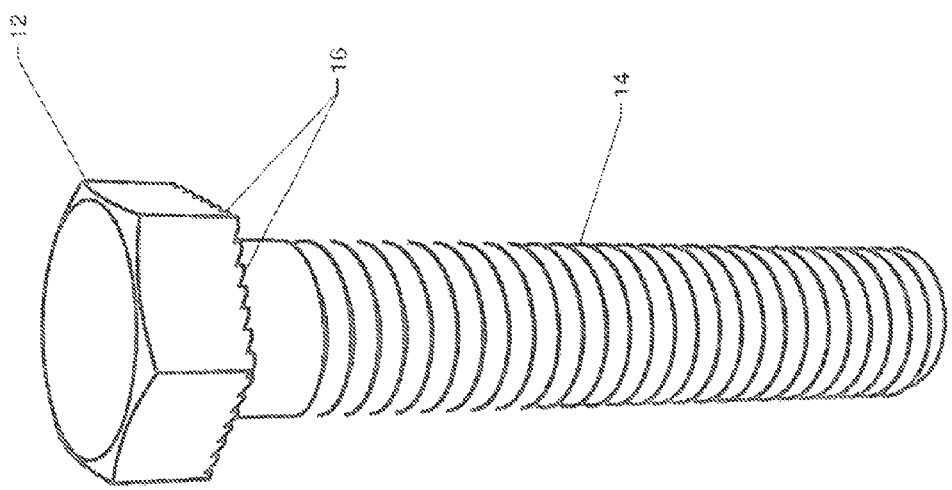
FIG. 1 is a perspective view, showing a hex-headed screw made according to the present invention.

FIG. 1 shows one embodiment of a screw made according to the present invention. Screw 10 includes conventional features such as hex head 12 and threaded shaft 14. However, the underside of hex head 12 (the side facing toward the threaded shaft) includes a significant novel feature—saw tooth array 16.

Figure 2:
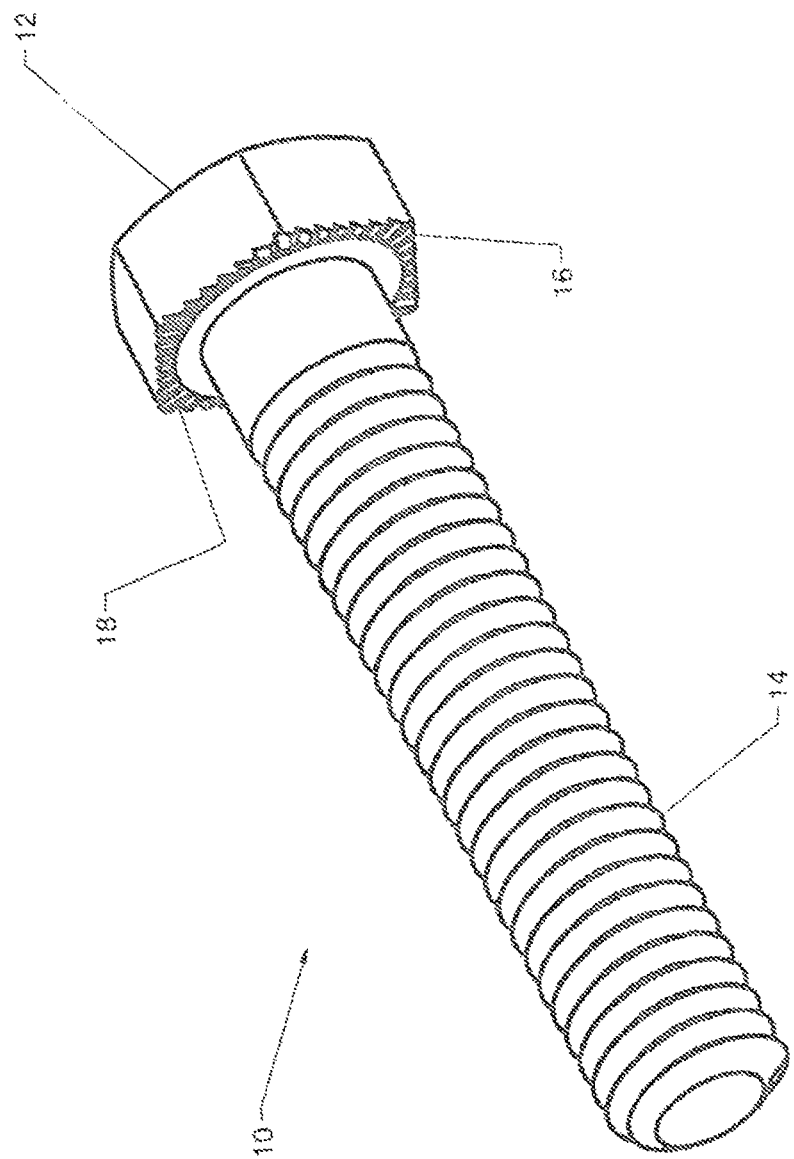
FIG. 2 is a perspective view, showing the screw of FIG. 1 from a different vantage point.
Figure 3:
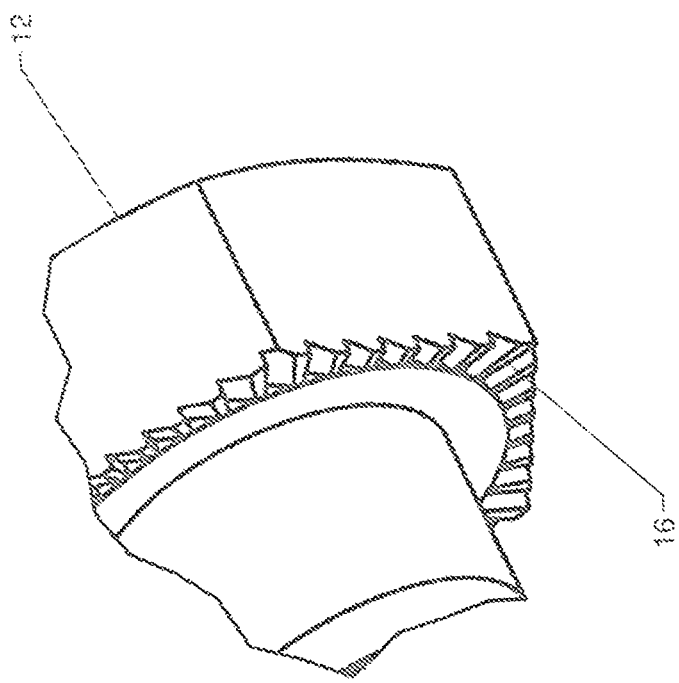
FIG. 3 is a detailed perspective view, showing more detail of the head of the fastener in FIG. 2.

FIG. 2 shows screw 10 from a vantage point looking toward the underside of hex head 12. The underside is labeled as thrust surface 18, since it is this surface which customarily mates against an abutting surface when the screw is tightened. The reader will observe that saw tooth array 16 is provided on at least a portion of thrust surface 18. FIG. 3 shows sawtooth array 16 in greater detail. The array is a radial array, meaning that each peak and valley in the saw tooth array is pointed toward the center of the fastener.

Figure 4:
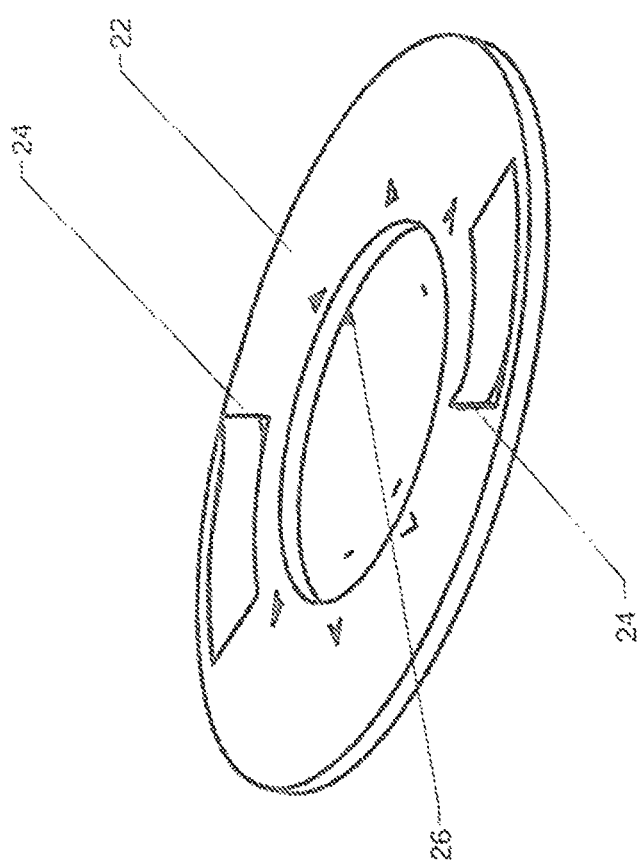
FIG. 4 is a perspective view, showing a lock washer configured for use with the screw of FIGS. 1-3.

FIG. 4 shows lock washer 20, which is designed to cooperate with the saw tooth array located on the screw. One or more spring tabs 24 are provided. These extend upward from outer surface 22. The spring tabs are preferably integral to the lock washer itself, but they may also be made as separate pieces. If they are integral, then it is important to make the lock washer of a resilient material such as spring steel.

The reader will observe that the opposite side of lock washer 20 (the side facing downward in the orientation shown in FIG. 4) includes a plurality of spikes 26. As the lock washer is forced against an abutting surface during the tightening of the screw, the spikes sink into the surface and prevent the rotation of the jock washer.

Figure 5:
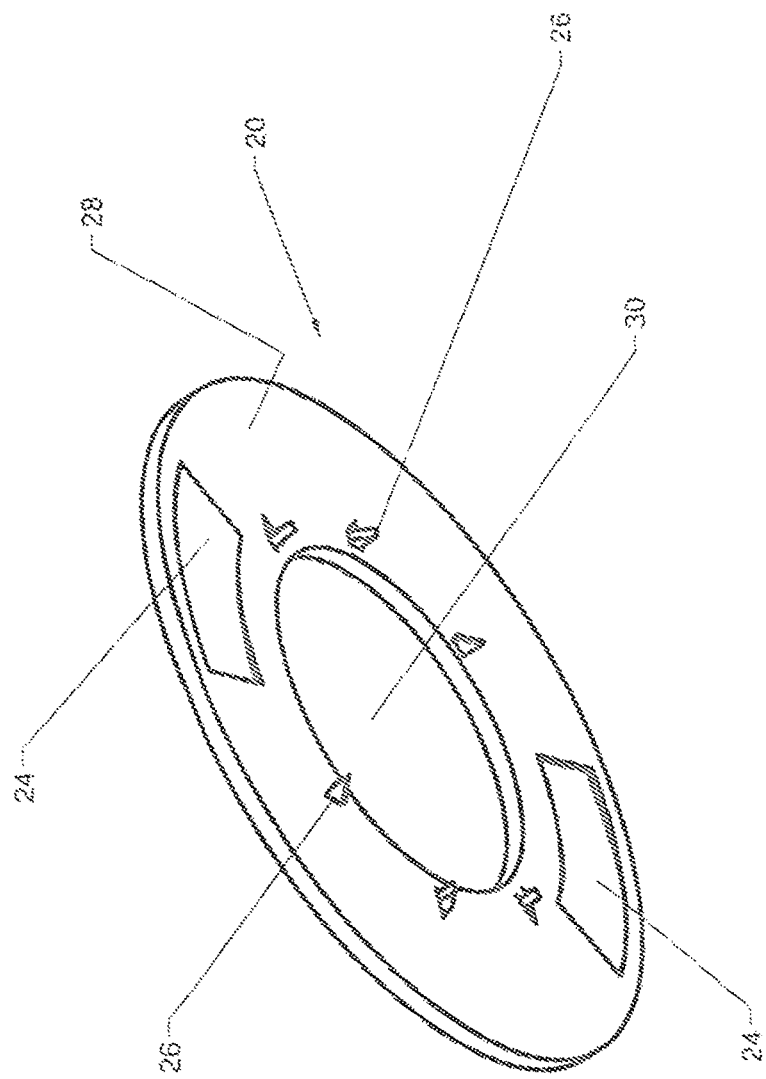
FIG. 5 is a perspective view, showing the opposite side of the lock washer.

FIG. 5 shows lock washer 20 from the opposite side. Central passage 30 provides clearance for the threaded shaft of the screw. Spikes 26 extend from inner surface 28. The spikes may assume any suitable form, and may in fact be triangular wedges bent downward from the material of the lock washer itself (as illustrated).

Figure 6:
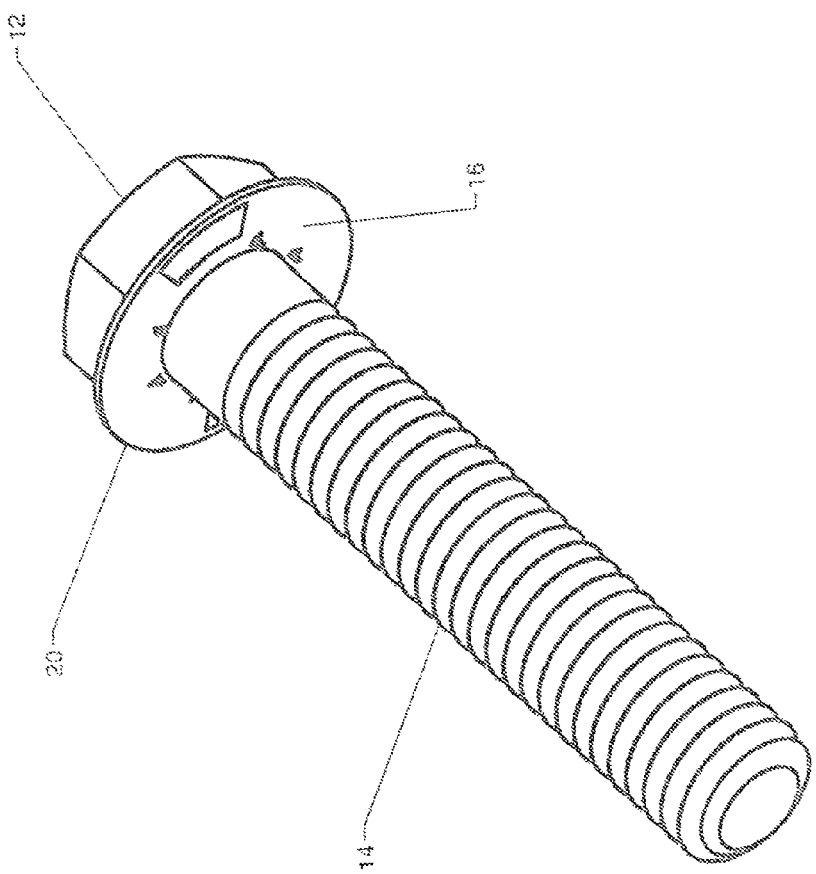
FIG. 6 is a perspective view, showing the screw and the lock washer assembled together.

FIG. 6 shows lock washer 20 installed over threaded shaft 14. The raised portions of the two spring tabs are positioned to bear against saw tooth array 16 when the screw is installed. The reader will observe that when the screw is installed and tightened, the spikes on the underside of the lock washer will sink into the surface and arrest the rotation of the lock washer. Saw tooth array 16 will then be rotating with respect to the spring tabs.

Figure 7:
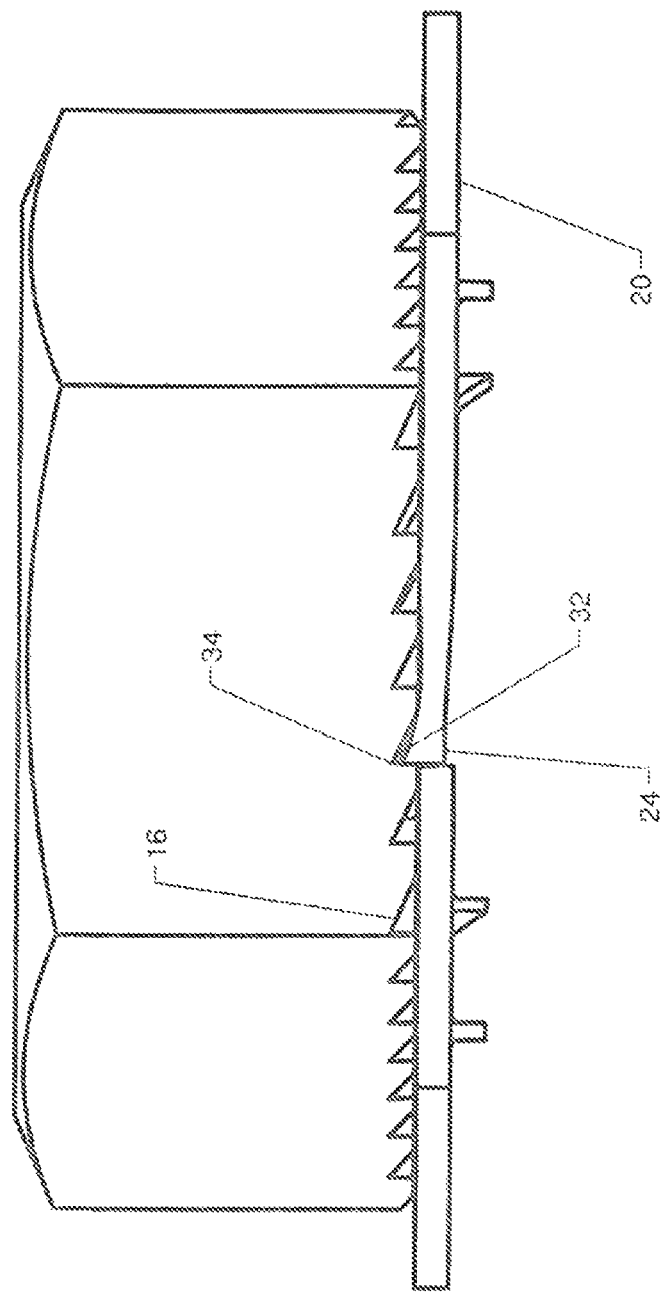
FIG. 7 is a detailed sectional view, showing the operation of the spring tab and the saw tooth array.

The embodiment shown is configured to allow clockwise rotation but prevent anti-clockwise rotation. FIG. 7 shows a detailed sectional view through the spring tabs and saw tooth array. For clockwise rotation, the portion of saw tooth array 16 nearest to the user will move to the left. This motion will cyclically depress and release tip 32 of spring tab 24—in the manner of a ratchet and pawl. However, if anti-clockwise rotation is attempted, tip 32 will snap into valley 34 and prevent any rotation in this direction.

Those skilled in the art will realize that the orientation of the spring tabs and the orientation of the saw tooth array should be made to conform in order to create the unidirectional ratchet and pawl action. The saw tooth array can be oriented oppositely to that shown in FIG. 7. However, if that is the case, one would want to "hinge" spring tab 24 on the opposite side. The orientation of these two components is a design choice, so long as they are configured to cooperate with each other. Thus, the components may be configured to permit clockwise rotation while preventing anti-clockwise rotation. Or, they may just as easily be configured to permit anti-clockwise rotation while preventing clockwise rotation.

Figure 8:
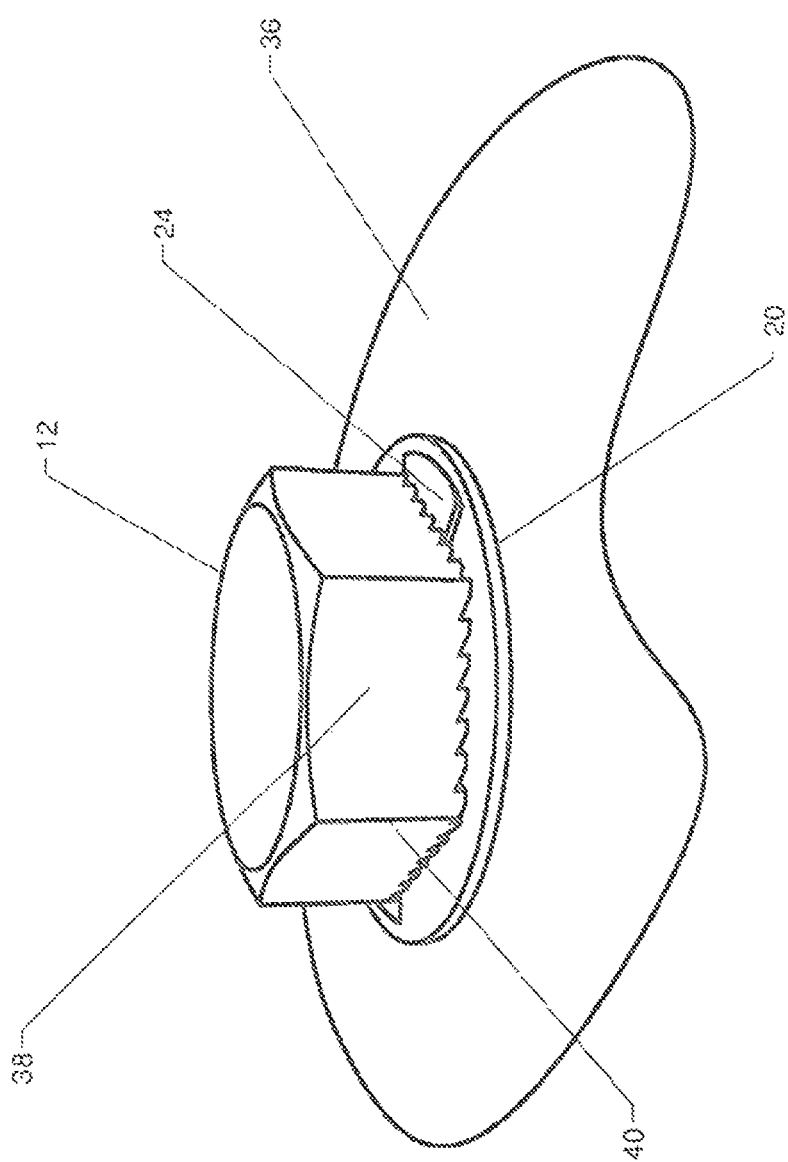
FIG. 8 is a perspective view, showing the fastener and the lock washer in an assembled state.

FIG. 8 shows a screw made according to the present invention in an installed state. Lock washer 20 is compressed by hex head 12 against mating surface 36. The reader will observe that spring tab 24 has engaged the saw tooth array on the hex head, thereby preventing the screw from turning in an anti-clockwise direction. The screw is thereby locked in position.

As shown in FIG. 8, it is preferable in this embodiment to locate spring tab 24 so that a portion of it sticks out beyond side walls 38 and corners 40 of the hex head. This feature allows the spring tab to be depressed so that the screw can be removed.

Figure 9:
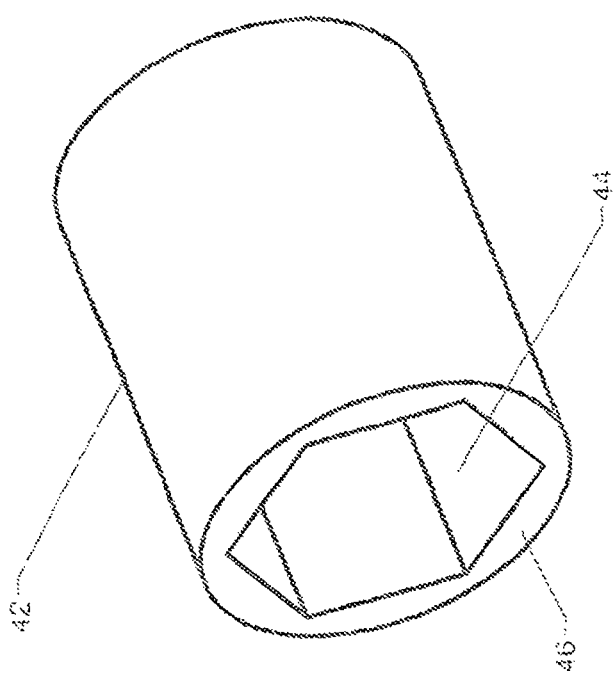
FIG. 9 is a perspective view, showing a socket which may be used to install or remove the fastener.

FIG. 9 shows socket 42, which is suitable for use in removing the screw shown in FIG. 8. Socket 42 includes hexagonal cavity 44—which is sized to slip over the hex bead. Those skilled in the art will know that FIG. 9 shows a "six point" socket. It is also possible to use a "twelve point" or "eighteen point" socket.

Forward surface 46 of socket 42 is preferably flat, so that when the socket is placed over the hex head of the screw and pressed against the lock washer, forward surface 46 will depress spring tabs 24 so that the spring tabs lie flush with the outer surface of the lock washer. The socket may then be turned in an anti-clockwise direction in order to back out the screw, provided that the socket is urged toward mating surface 36 while it is being turned. Thus, the use of a conventional socket can defeat the unidirectional latching mechanism and permit the removal of screw 10.

While the embodiment of FIGS. 1-9 provides an effective solution, it will be desirable in other applications to conceal the unidirectional locking mechanism underneath the head of the screw. This is true of medical applications, where allowing a portion of the spring tab to extend out beyond the screw head may be undesirable.

Figure 10:
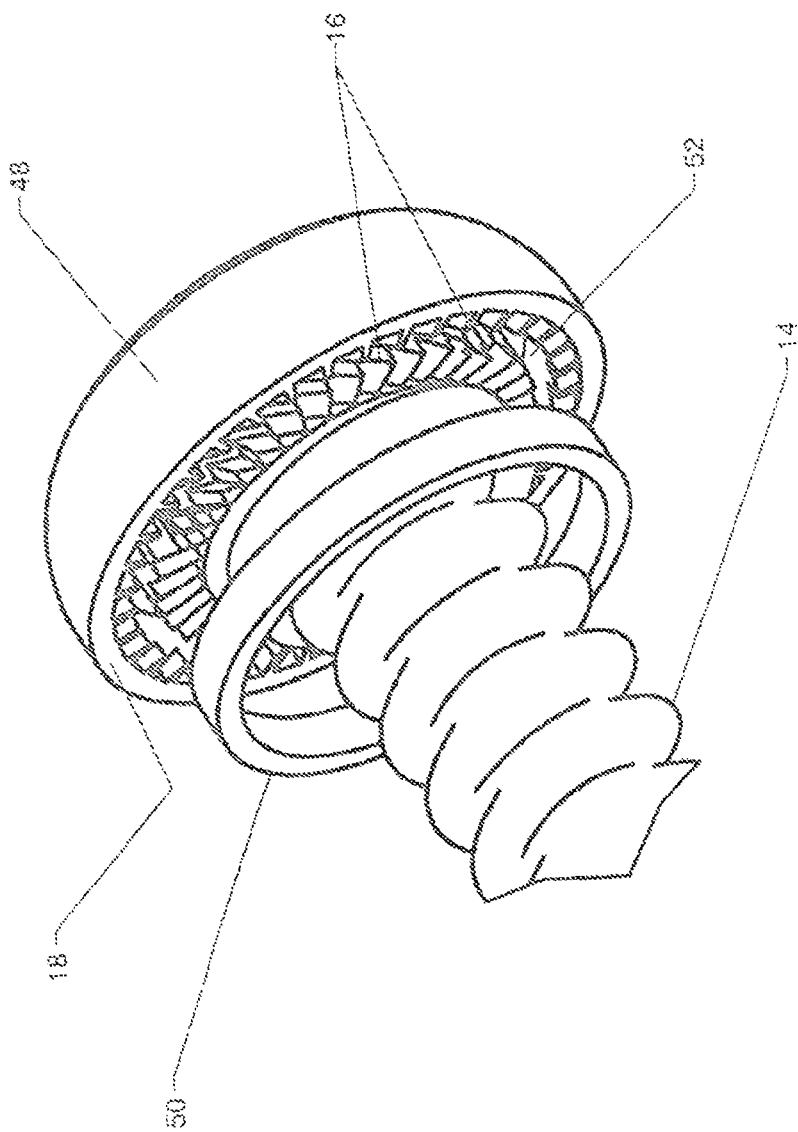
FIG. 10 is a detailed perspective view, showing an alternate embodiment in which the saw tooth array includes an annular channel sized to receive a release ring.

FIGS. 10-15 shows an embodiment in which the spring tabs lie entirely beneath the head of the screw. FIG. 10 is a detailed view of thrust surface 18 on a screw having round head 48 (as opposed to a hex head). Radially disposed saw tooth array 16 is present on thrust surface 18, as for the prior embodiment. However, a different release mechanism is used in this version.

The reader will observe that thrust surface 18 opens into annular channel 52—which actually splits the saw tooth array into two separate sections. Annular channel 52 is sized to receive release ring 50. The annular channel may include tab slots or other features to positively retain the release ring, or the release ring may simply be held in place by the lock washer (not yet added in the view of FIG. 10).

Figure 11:
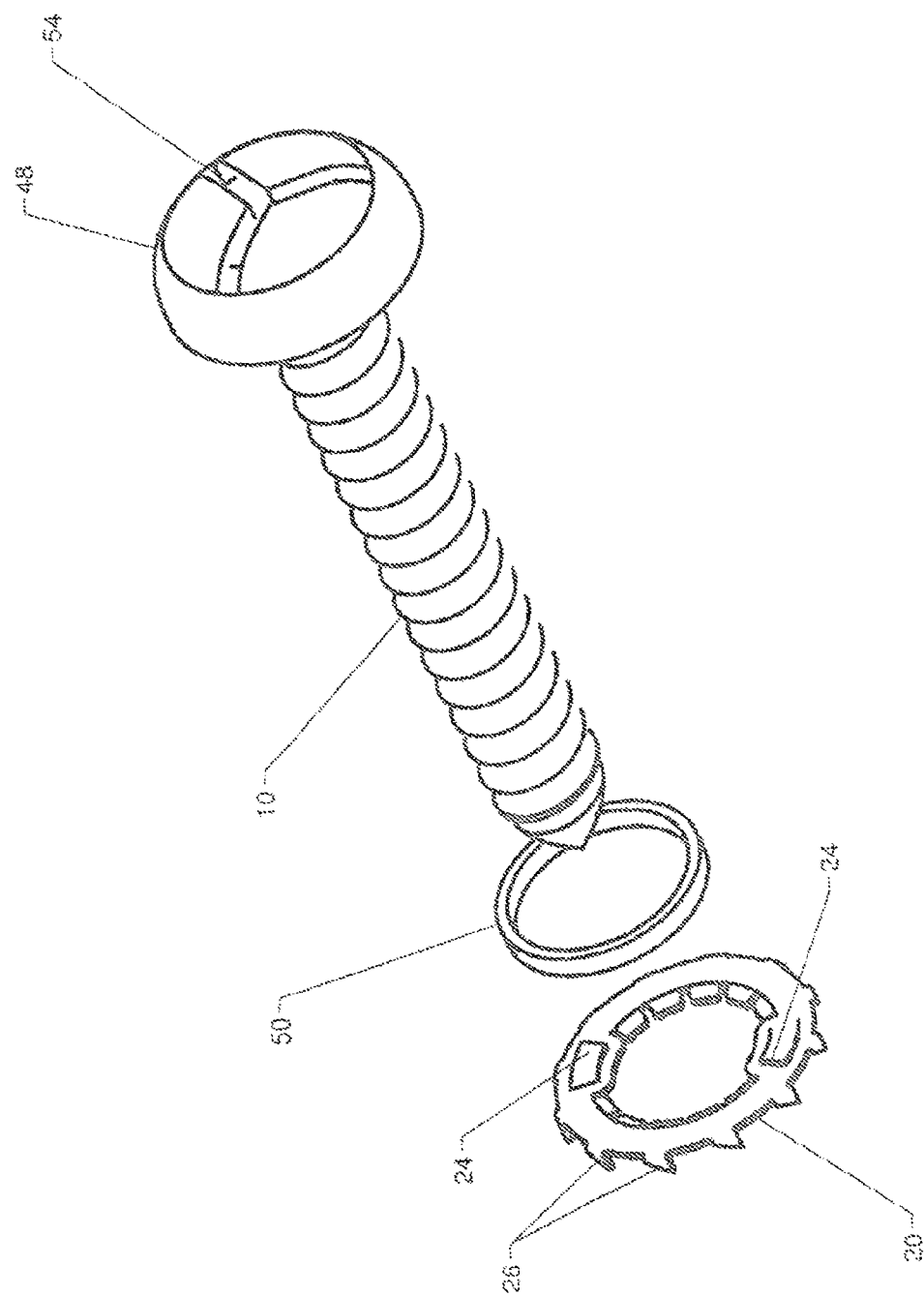
FIG. 11 is an exploded perspective view, showing the alternate embodiment of FIG. 10 as well as a release ring and a lock washer.

FIG. 11 presents an exploded perspective view, with lock washer 20, release ring 50, and screw 10 being aligned along a central axis. In this embodiment, round head 48 includes tri-blade receiver 54, which is configured to receive a special extraction tool. Release ring 50 is slipped over the threaded shaft and into annular channel 52 on the underside of the screw head. Lock washer 20 is then placed in position beneath the screw head.

The lock washer contains one or more spring tabs 24 (preferably at least two spring tabs). These are positioned to engage the saw tooth array on the underside of the screw head—as explained for the previous embodiment. Lock washer 20 also includes spikes 26 or other suitable engagement features which arrest the rotation of the lock washer when the screw is inserted into the material it is fastened to.

Figure 12:
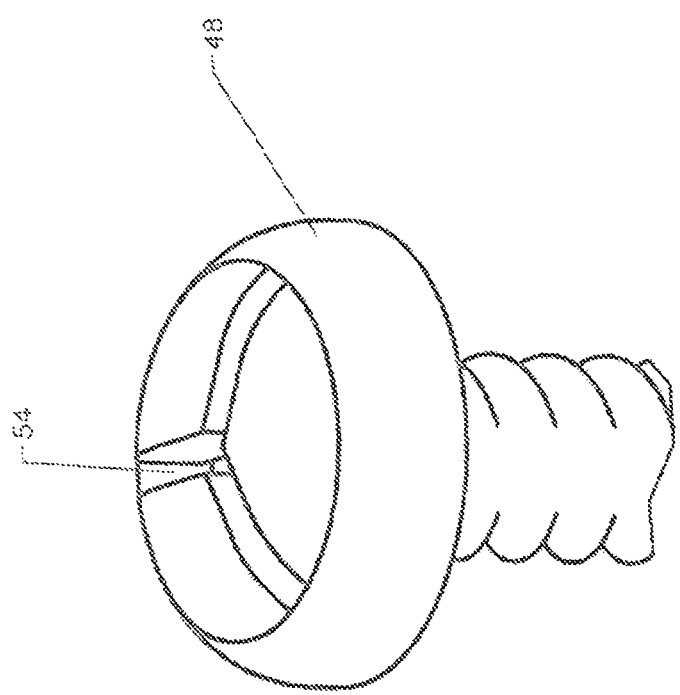
FIG. 12 is a detailed perspective view, showing a head including a tri-blade receiver.
Figure 13:
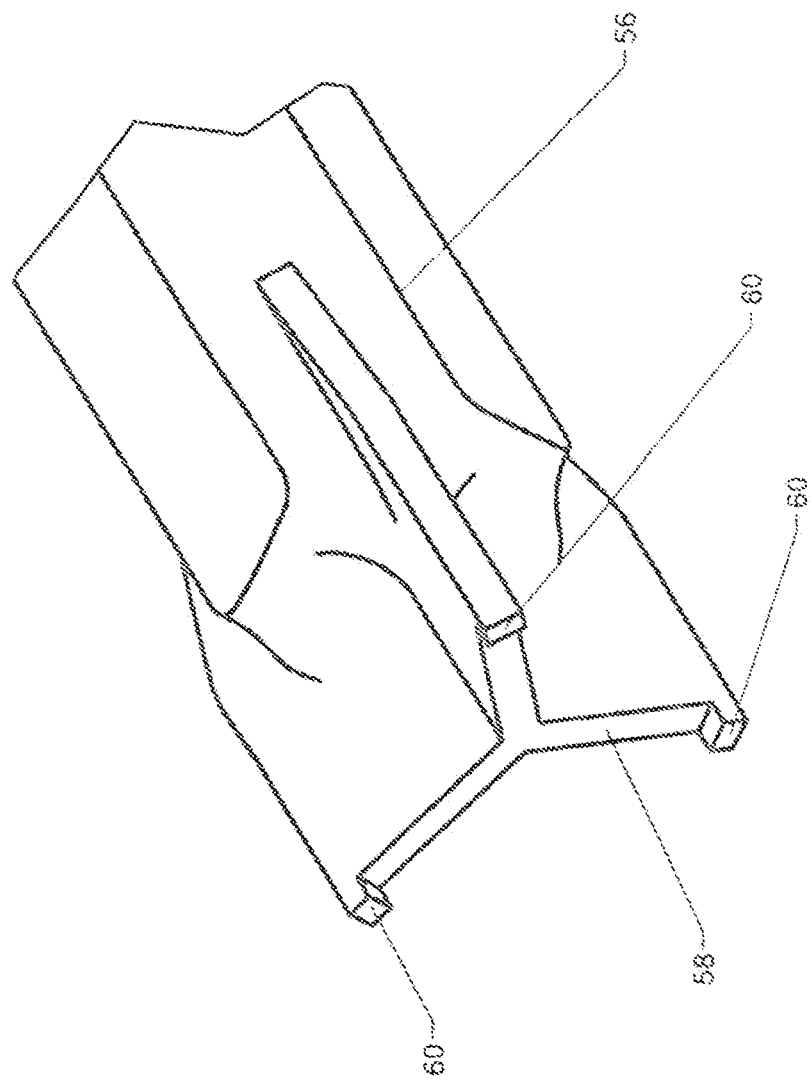
FIG. 13 is a perspective view, showing an extraction tool incorporating a tri-blade.

FIG. 12 shows a detailed perspective view of round head 48. Tri-blade receiver 54 is shaped to receive an extraction tool. FIG. 13 shows a detailed view of the tip of extraction tool 56. In comparing FIGS. 12 and 13, the reader will note that tri-blade 58 is sized to slide into tri-blade receiver 54.

However, if the user simply inserts the tri-blade and attempts to unscrew the fastener in an anti-clockwise direction, the engagement of spring tabs 24 will prevent the desired motion. Thus, an additional feature is preferably added to the extraction tool to unlatch the unidirectional latching mechanism. In FIG. 13, the reader will observe the presence of a tip prong 60 on the tip of each of the three blades of the tri-blade. The three tip prongs are designed to urge release ring 50 against the spring tabs when the tri-blade is pressed into tri-blade receiver 54.

Figure 15:
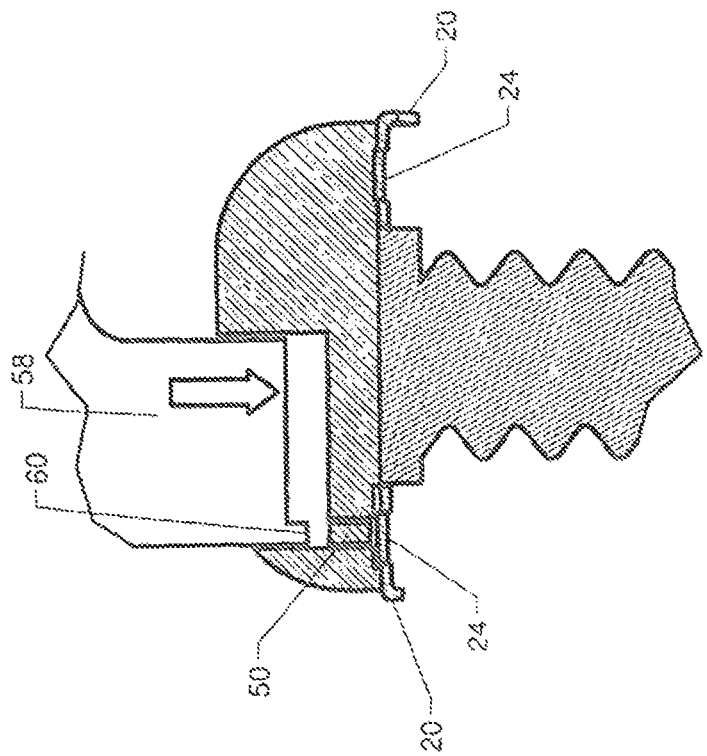
FIG. 15 is a sectional elevation view, showing how the extraction tool actuates the release ring to allow the fastener to be removed.
Figure 14:
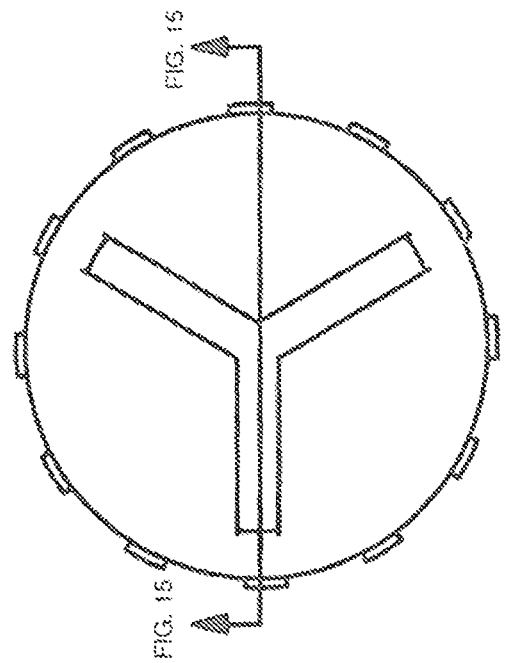
FIG. 14 is a plan view, showing the head of a fastener including a tri-blade receiver.

In order to understand how the release ring is actuated, the reader's attention is directed to FIGS. 14 and 15. FIG. 14 shows a top view of round head 48. FIG. 15 presents a sectional view which is called out in FIG. 14. The reader will note that the section is taken through one of the three slots of the tri-blade receiver.

FIG. 15 shows the sectional view. The drawing view shown the fastener head and threaded shaft as being two separate pieces joined together. While this is possible, it is also possible make the two components as one unified piece.

The reader will observe that the tri-blade receiver joins into the upper portion of annular channel 52. Thus, tip prong 60 is able to contact and move release ring 50. The release ring is preferably made of a stiff material so that when it is pressed down by the three tip prongs, it will urge the upstanding portions of both spring tabs 24 down until they are flush with the rest of the lock washer. The stiffness of the release ring is preferred since a tip prong may not lie directly over a particular spring tab.

The user must press the tri-blade into the screw head as shown and keep it pressed inward in order to flatten the spring tabs while the screw is turned in an anti-clockwise direction. Thus, the tri-blade and associated tip prongs perform the same functions as the socket in the first disclosed embodiment.

Figure 16:
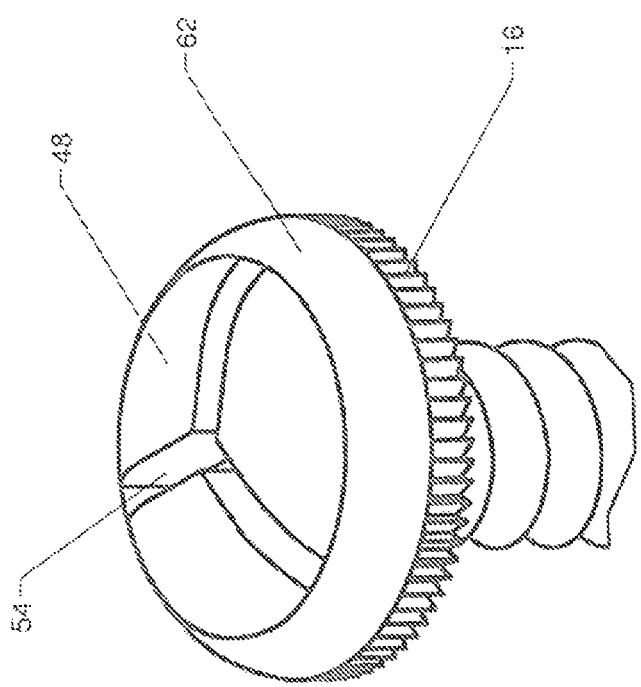
FIG. 16 is a perspective view, showing another alternate embodiment in which the saw tooth array is provided on an outward facing perimeter surface of a fastener head.

Those skilled in the art will realize that the interaction between the saw tooth array and the lock washer can assume many forms. The saw tooth array in the first embodiments faces toward the mating surface. In the embodiment disclosed in FIGS. 16-19, the saw tooth array faces radially outward. FIG. 16 shows a screw having round head 48 and tri-blade receiver 54. However, saw tooth array 16 is placed on outward facing perimeter surface 62 rather than the thrust surface.

Figure 17:
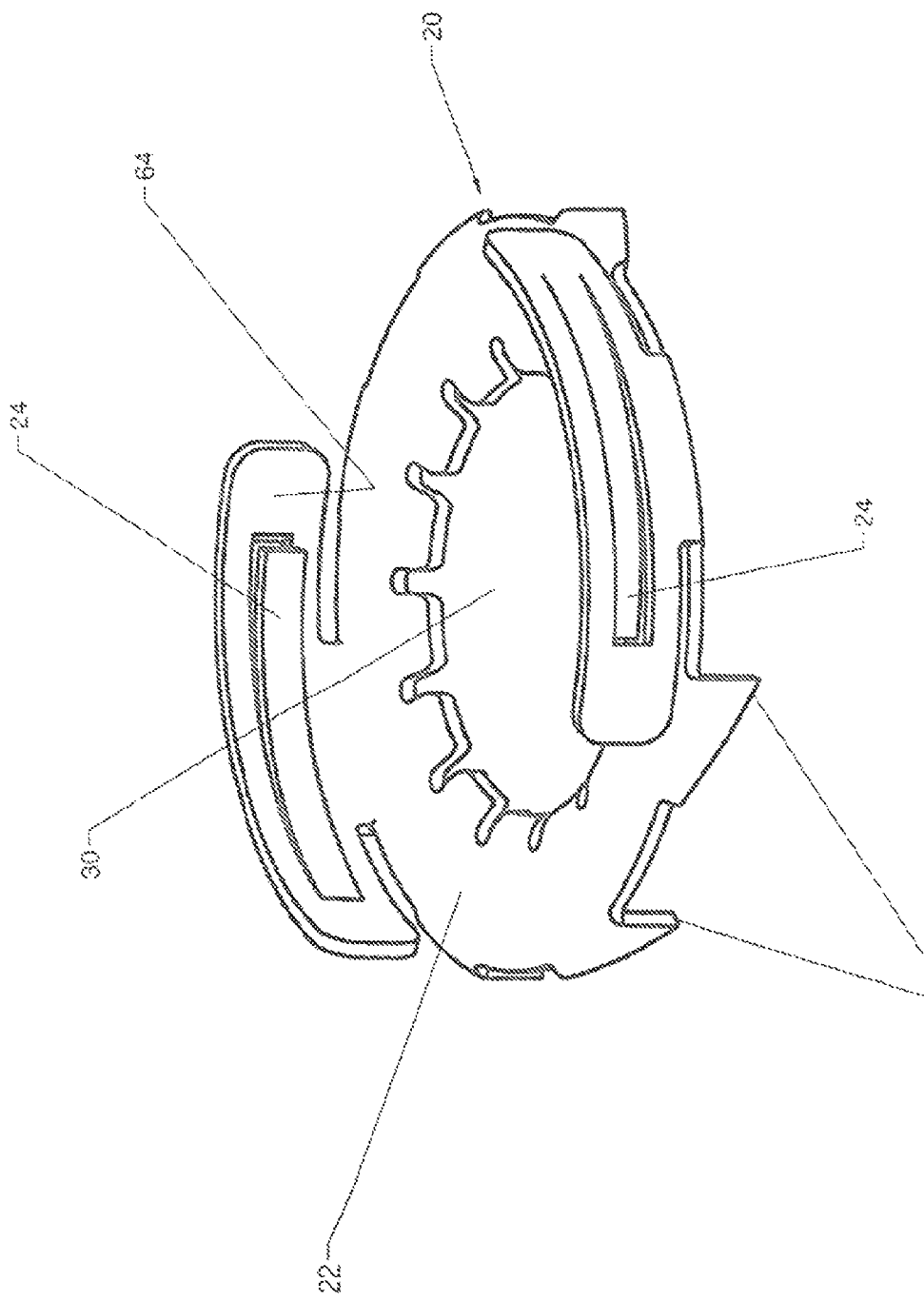
FIG. 17 is a perspective view, showing an alternate embodiment of a lock washer configured for use with the fastener of FIG. 16.

The lock washer must of course be reconfigured to operate with a screw head such as shown in FIG. 16. FIG. 17 shows a lock washer 20 having inward facing perimeter surface 64 in addition to outer surface 22. Spring tabs 24 are located on inward facing perimeter surface 64. The ratchet-and-pawl interaction between the spring tabs and the saw tooth array may be easily discerned by studying FIGS. 16 and 17 together.

In this embodiment, clockwise rotation is permitted, while anti-clockwise rotation is prevented. The lock washer has other features as previously discussed—including spikes 26 to prevent rotation and central passage 30 to admit the threaded shaft. However, the previously discussed extraction tools will not function with this embodiment.

Figure 18:
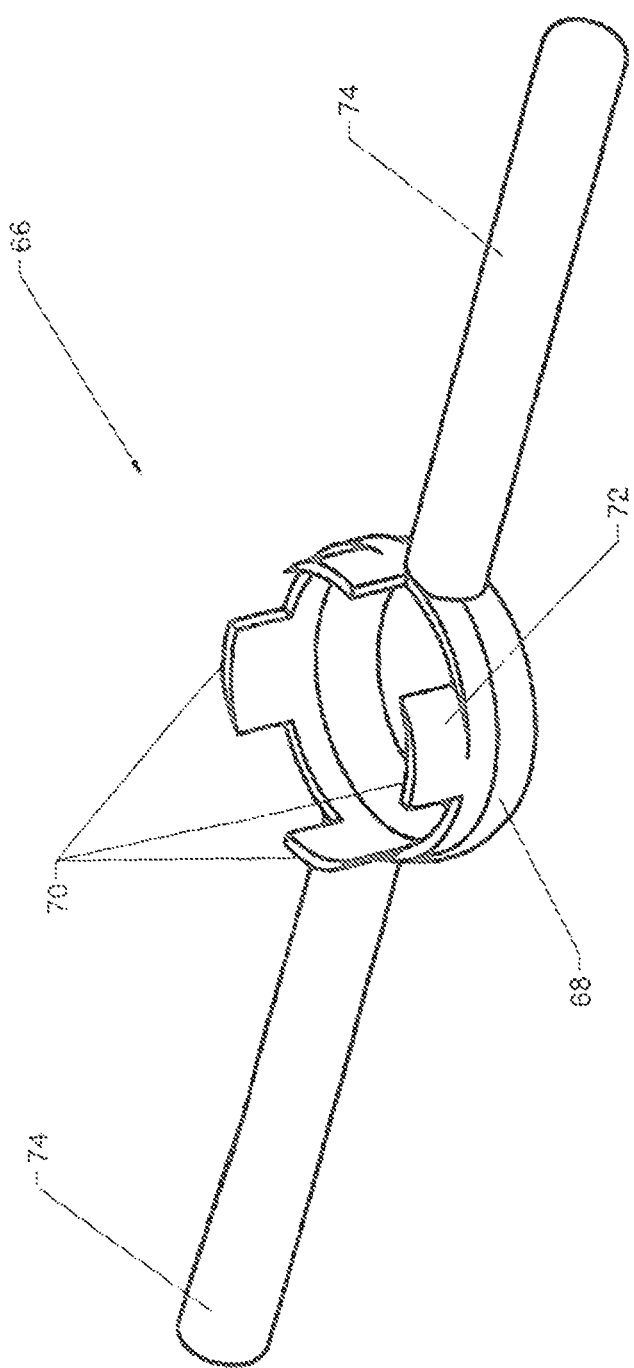
FIG. 18 is a perspective view, showing an extraction tool configured for use with the alternate embodiment of FIG. 16.

FIG. 18 shows another type of extraction tool configured for use with the screw of FIG. 16—cylindrical extraction tool 66. In order to disengage the spring tabs in the lock washer shown in FIG. 17, it is necessary to insert an object between the saw tooth array on the bolt head and the spring tabs. Cylindrical extraction tool 66 includes four extensions 70 (extending from cylinder 68) for this purpose. Each of the four extensions 70 includes a camming surface 72. One or more handles 74 are attached to cylinder 68 so that a user may grasp and turn the extraction tool.

Figure 19:
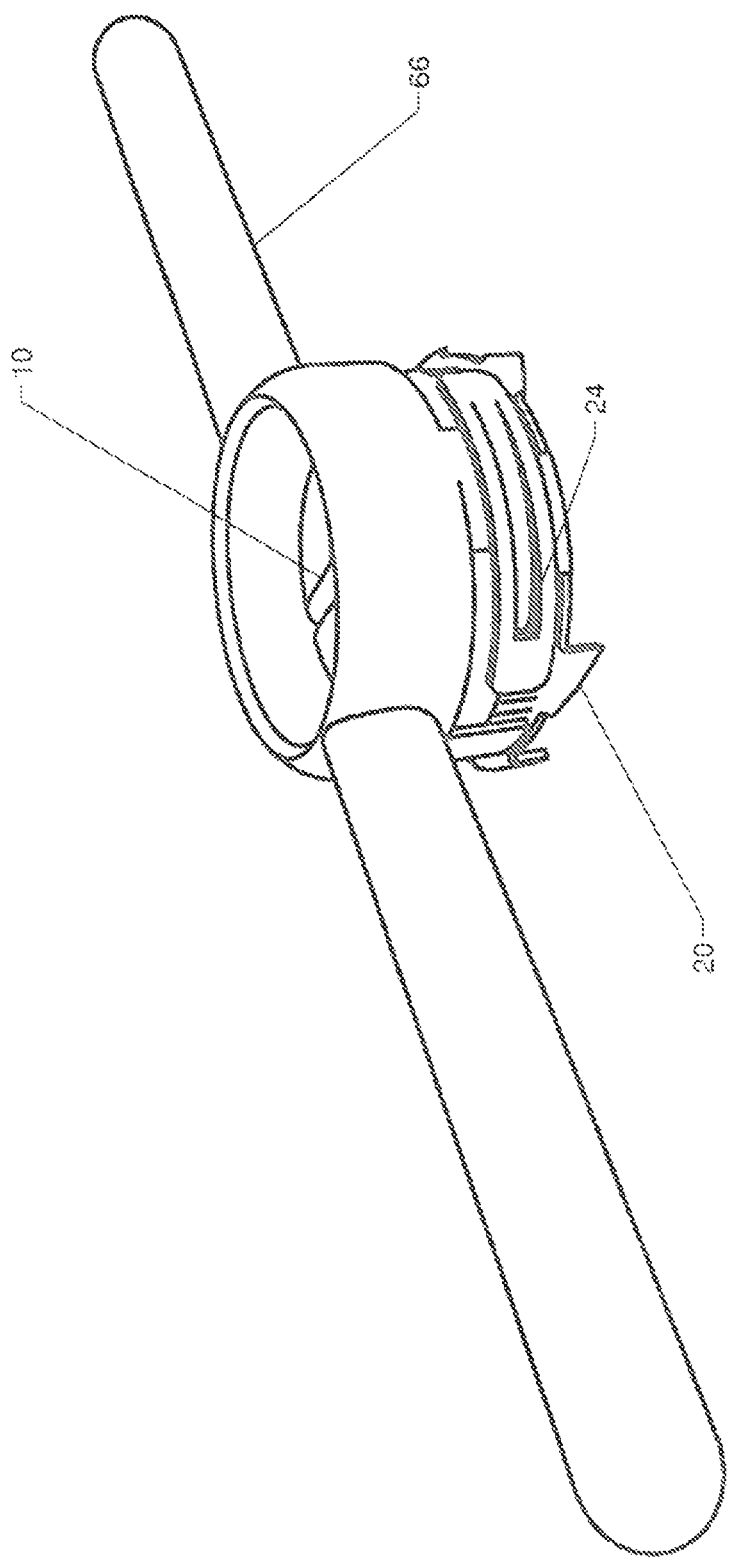
FIG. 19 is a perspective view, showing the use of the extraction tool of FIG. 18.

FIG. 19 shows extraction tool 66 being used. The user slips the extensions 70 in between the head of the screw and inward facing surface 64 of the lock washer. The user must rotate the extraction tool until the extensions slide into a location not occupied by a spring tab. The user then rotates extraction tool 66 in a clockwise direction until camming surfaces 72 press spring tabs 24 outward—thereby disengaging them from the saw tooth array. The user then inserts the tri-blade extraction tool into the head of screw 10 and rotates the screw counterclockwise while holding extraction tool 66 in position.

The unidirectional locking mechanism is also well-suited for application to deck screws. Those skilled in the art will know that a deck screw is typically used to secure a broad plank on a deck surface to a supporting joist. Deck screws sometimes back out under thermal cycling or other influences. Because people often walk on deck surfaces in bare feet, the exposure of the head of a deck screw is particularly hazardous.

Figure 20:
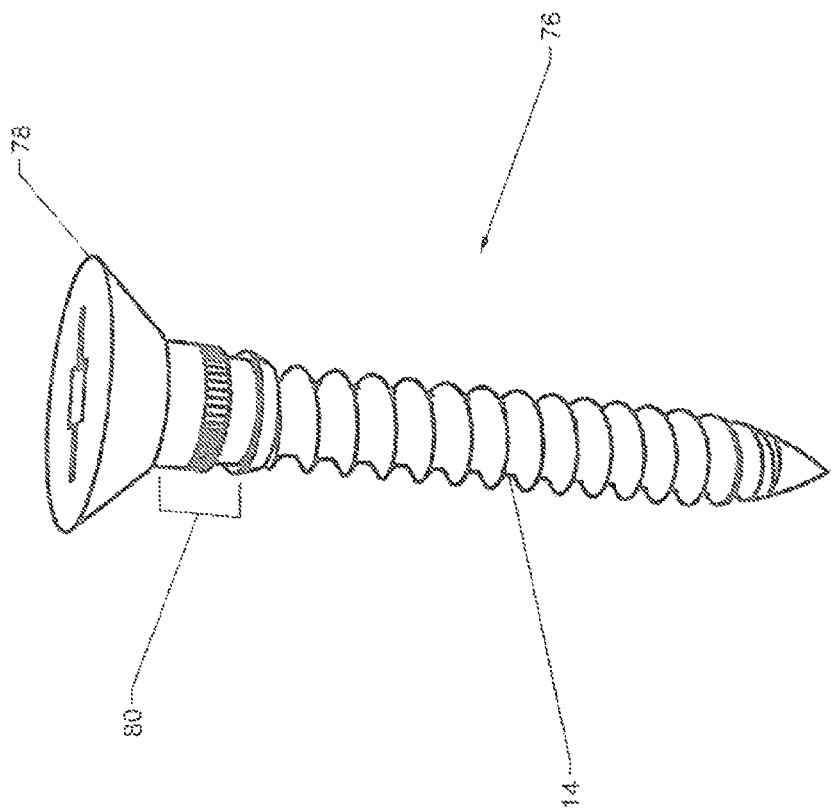
FIG. 20 is a perspective view, showing an alternate embodiment of the invention configured for use as a deck screw.

FIGS. 20-26 illustrate an alternate embodiment of the present invention which is particularly suited for use as a deck screw. FIG. 20 shows deck screw 76, which includes countersunk head 78 connected to threaded shaft 14. The portion of the deck screw immediately beneath the head includes unique features. This portion is labeled as latching shank 80. The reader should note that the use of directional terms such as "beneath" refer to the fact that a deck screw is typically installed in a downward direction. Such terms should not be viewed as limiting, since the deck screw embodiment can be installed in any desired direction.

Figure 21:
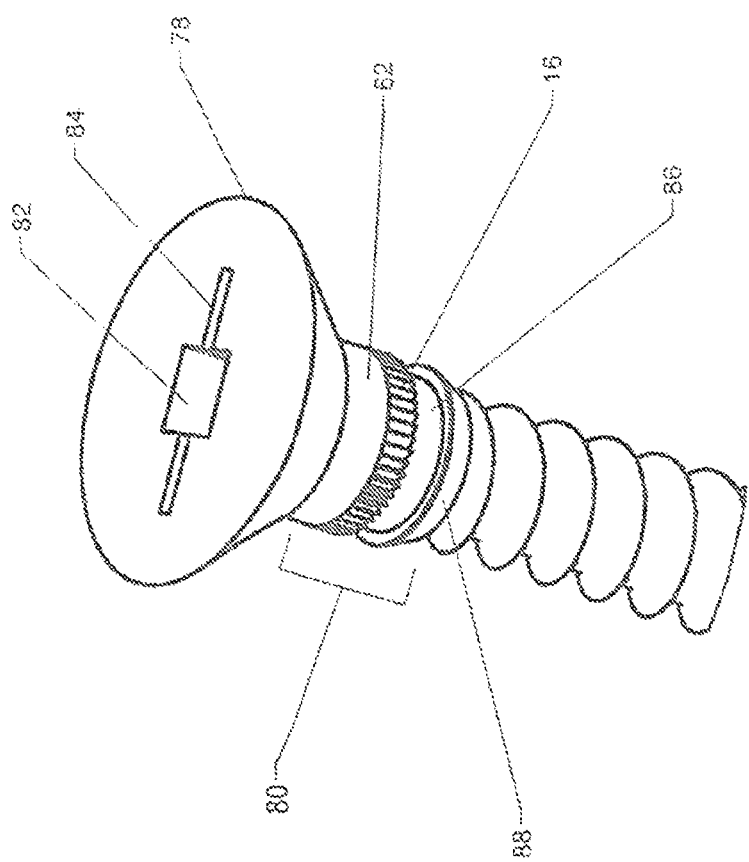
FIG. 21 is a perspective view, showing details of the head of the fastener shown in FIG. 20.

FIG. 21 shows the upper region of the deck screw in more detail. Latching shank 80 includes an outward facing perimeter surface 62. Saw tooth array 16 is included on this outward facing surface. Annular recess 86 is located immediately beneath saw tooth array 16. The annular recess is actually bounded on one side by the saw tooth array and on a second side by shoulder 88.

Figure 22:
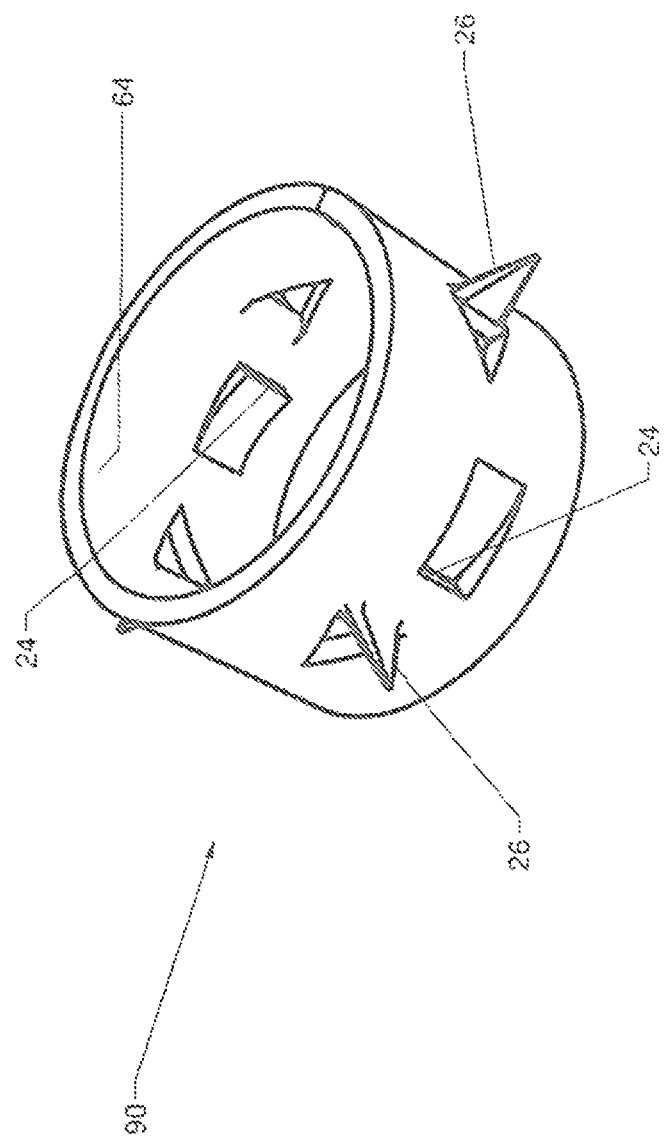
FIG. 22 is a perspective view, showing a lock ring for use with the deck screw embodiment.

FIG. 22 illustrates an additional component which operates in cooperation with the features of latching shank 80. Lock ring 90 is a cylindrical structure having inward facing perimeter surface 64. One or more spring tabs 24 extend inward from inward facing perimeter surface 64. The spring tabs cooperate with the saw tooth array to create a unidirectional latching mechanism as for the prior embodiments.

One or more spikes 26 extend outward from lock ring 90. These are positioned to dig into the material surrounding the lock ring and prevent the rotation of the lock ring when the deck screw is installed.

Figure 23:
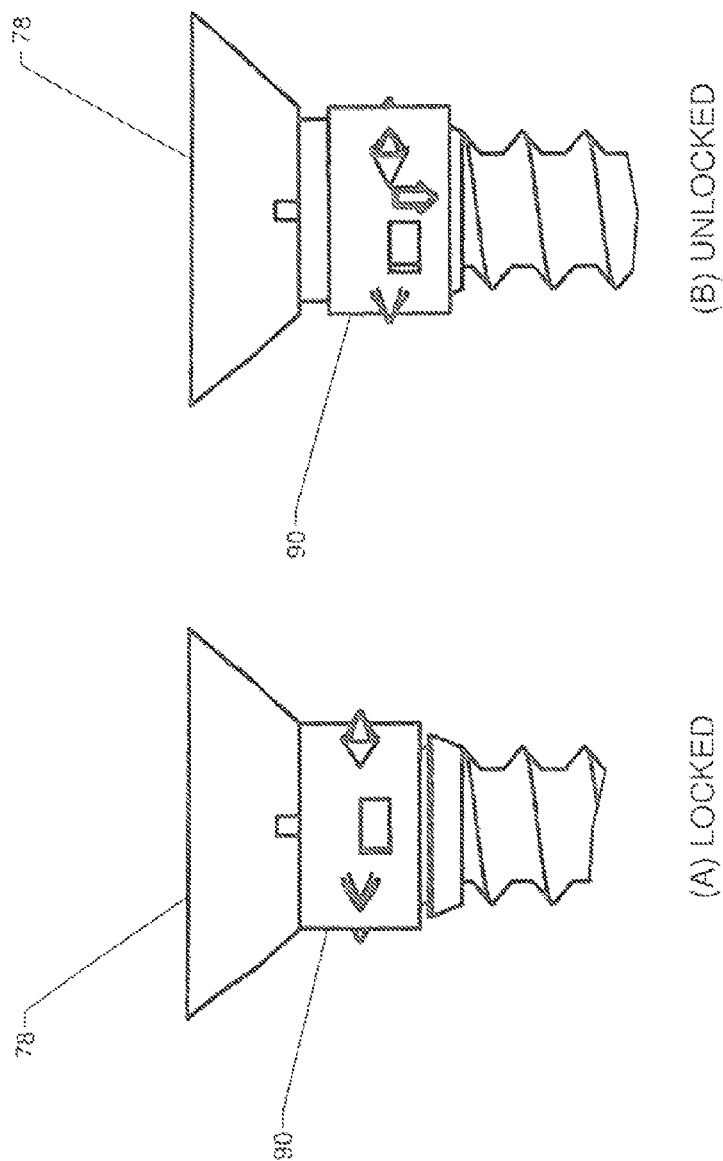
FIG. 23 is a detailed elevation view, showing the operation of the latching mechanism in the deck screw embodiment.

FIG. 23 shows the lock ring installed on the deck screw. In FIG. 23(A), lock ring 90 is in a raised position (up against countersunk head 78) so that the spring tabs extending inward from the lock ring engage saw tooth array 16 on deck screw 76. In FIG. 23(B), lock ring 90 is moved downward with respect to countersunk head 78. Its downward movement is preferably arrested by shoulder 88 so that the spring tabs lie within annular recess 86 (see FIG. 21).

Figure 24:
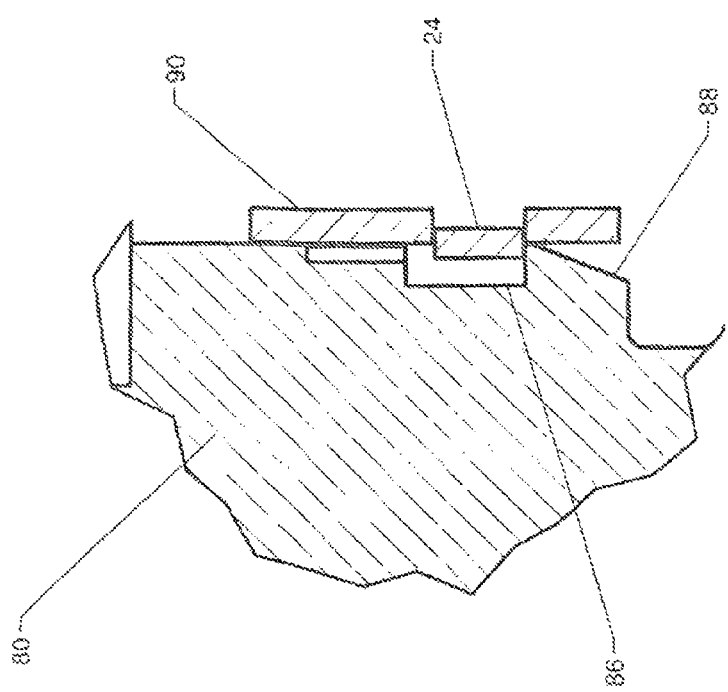
FIG. 24 is a detailed section view, showing the operation of the latching mechanism in the deck screw embodiment.

FIG. 24 is a detailed section view showing the state of the assembly from FIG. 23(B). The reader will observe how spring tab 24 lies within annular recess 86. In this position the spring tab does not engage the saw tooth array. The deck screw is therefore able to rotate in either direction with respect to the lock ring.

FIG. 23(A) represents the state of the assembly when the deck screw is installed into a decking plank. The lock ring is driven into the wood as the deck screw is tightened. The lock ring is forced up against countersunk head 78. The spikes extending outward from the lock ring dig into the surrounding wood and prevent the rotation of the lock ring.

In comparing the orientation of the spring tabs 24 in FIG. 22 to the orientation of the teeth in saw tooth array 16 of FIG. 21, those skilled in the art will realize that the deck screw is able to rotate in a clockwise direction with respect to the lock ring but not in an anti-clockwise direction. Thus, the deck screw may be screwed into place, but it is unable to "back out."

However—as for the prior embodiments—it is preferable to provide a feature which defeats the latching mechanism. FIG. 21 shows the head of the deck screw in some detail. "Square drive" bits are often used for the installation of deck screws. Thus, it is preferable to provide square drive receiver 82 in the head of the screw so that a conventional bit may be used to install the screw. Access slot 84 is provided to accommodate a specialized removal tool. The reader should note that at least a portion of access slot 84 passes all the way through countersunk head 78.

FIG. 25 shows a specialized extraction bit 92. It includes a conventional square drive 94. This portion is sized to be a sliding fit within square drive receiver 82. Two wings 96 extend from the sides of square drive 94. The wings are sized to slide through access slot 84.

FIG. 26 shows extraction bit 92 in use. When the extraction bit is pressed into the head of the deck screw, wings 96 bear against lock ring 90 and force it down away from countersunk head 78. This motion slides the spring tabs on the lock ring out of engagement with the saw tooth array. If extraction bit 92 is then rotated in an anti-clockwise direction, the deck screw will rotate with respect to the lock ring so that it can be unscrewed from the deck.

Those skilled in the art will realize that many other embodiments are possible within the scope of the present invention. As a first example, one could elect to place the spring tabs on the screw head and the saw tooth array on the lock washer.

One could also substitute many other features for the spikes used to hold the lock washer in position in the illustrations. One could—for example—create an embodiment in which the lock washer is pulled down into a countersunk or counter-bored hole and the spikes face outward rather than downward. One could also use a high strength adhesive on the lock washer rather than spikes. As long as the feature employed arrests the rotation of the lock washer, it will suffice.

As still another example, some embodiments might use only a single blade for the extraction tool rather than the tri-blade configuration shown in FIG. 13. Prongs could still be provided on the edges of the tips, but the single blade would resemble a standard screwdriver rather than the more complex shape shown in FIG. 13.

Although the preceding descriptions contain significant detail, they should properly be viewed as disclosing examples of the inventions' many possible embodiments rather than limiting the scope of the invention. For instance, the present invention could be used with ¼ turn fasteners rather than the fully threaded fasteners shown in the illustrations. Many other embodiments are possible. Thus, the scope of the invention should properly be determined by the claims rather than any specific examples provided.

Having described our invention, we claim:

1. A mechanical fastener assembly including an anti-rotation feature configured to prevent rotation with respect to a material into which said fastener assembly is screwed, said mechanical fastener assembly configured to be turned by a driving tool, comprising:
  a. a threaded shaft extending along a central axis and having a first end and a second end;
  b. a latching shank connected to said first end of said threaded shaft;
  c. a head connected to said latching shank, said head including a receiver configured to receive said driving tool;
  d. an outward facing sawtooth array on said latching shank;
  e. a lock ring encircling said latching shank;
  f. said lock ring including an outward-facing rotation-preventing feature configured to prevent rotation between said lock ring and said material into which said fastener is driven;
  g. wherein said lock ring includes a spring tab configured to engage said sawtooth array and allow rotation of said sawtooth array in a first direction with respect to said spring tab but prevent rotation in a second direction;

h. wherein said lock ring is configured to slide along said latching shank in a direction parallel to said central axis of said threaded shaft from a first position to a second position;
i. said first position is proximate said head;
j. said second position is distal to said head;
k. wherein said lock ring is configured so that said spring tab does not engage said sawtooth array when said lock ring is in said second position;
l. wherein said head includes an access slot; and
m. wherein said driving tool is configured to pass through said slot and contact said lock ring in order to move said lock ring from said first position to said second position.

2. A mechanical fastener assembly as recited in claim 1, wherein said driving tool includes a pair of lateral wings configured to pass through said access slot and engage said lock ring.

3. A mechanical fastener assembly as recited in claim 1, wherein said lock ring includes multiple spring tabs, each of which is configured to engage said sawtooth array and allow rotation of said sawtooth array in a first direction with respect to said spring tab but prevent rotation in a second direction.

4. A mechanical fastener assembly as recited in claim 1, wherein said outward-facing rotation-preventing feature on said lock ring is a spike.

5. A mechanical fastener assembly as recited in claim 1, wherein said outward-facing rotation-preventing feature on said lock ring comprises multiple spikes.

6. A mechanical fastener assembly as recited in claim 1, wherein said head is a countersunk head.

7. A mechanical fastener assembly as recited in claim 1, wherein said receiver is a square drive receiver.

8. A mechanical fastener assembly as recited in claim 1, wherein said driving tool comprises a square drive with a pair of lateral wings extending outward from opposite sides of said square drive.

9. A mechanical fastener assembly including an anti-rotation feature configured to prevent rotation with respect to a material into which said fastener assembly is screwed, said mechanical fastener assembly configured to be turned by a driving tool, comprising:
a. a threaded shaft extending along a central axis and having a first end and a second end;
b. a latching shank connected to said first end of said threaded shaft;
c. a head connected to said latching shank;
d. an outward facing sawtooth array on said latching shank;
e. a lock ring encircling said latching shank;
f. said lock ring including an outward-facing rotation-preventing feature configured to prevent rotation between said lock ring and said material into which said fastener is screwed;
g. said lock ring including an inward-facing spring tab configured to engage said sawtooth array and allow rotation of said sawtooth array in a first direction with respect to said spring tab but prevent rotation in a second direction;
h. wherein said lock ring is configured to slide along said latching shank in a direction parallel to said central axis of said threaded shaft from a first position to a second position;
i. wherein said first position is proximate said head;
j. wherein said second position is distal to said head;
k. wherein said lock ring is configured so that said spring tab does not engage said sawtooth array when said lock ring is in said second position;
l. wherein said head includes an access slot; and
m. wherein said driving tool is configured to pass through said slot and contact said lock ring in order to move said lock ring from said first position to said second position.

10. A mechanical fastener assembly as recited in claim 9, wherein said driving tool includes a pair of lateral wings configured to pass through said access slot and engage said lock ring.

11. A mechanical fastener assembly as recited in claim 9, wherein said lock ring includes multiple spring tabs, each of which is configured to engage said sawtooth array and allow rotation of said sawtooth array in a first direction with respect to said spring tab but prevent rotation in a second direction.

12. A mechanical fastener assembly as recited in claim 9, wherein said outward-facing rotation-preventing feature on said lock ring is a spike.

13. A mechanical fastener assembly as recited in claim 9, wherein said outward-facing rotation-preventing feature on said lock ring comprises multiple spikes.

14. A mechanical fastener assembly as recited in claim 9, wherein said head is a countersunk head.

15. A mechanical fastener assembly as recited in claim 9, wherein said head includes a square drive receiver.

16. A mechanical fastener assembly as recited in claim 9, wherein said driving tool comprises a square drive with a pair of lateral wings extending outward from opposite sides of said square drive.

* * * * *